United States Patent
Yoon

(12) 
(10) Patent No.: US 6,375,853 B1
(45) Date of Patent: Apr. 23, 2002

(54) METHODS OF USING MODIFIED NATURAL PRODUCTS AS DEWATERING AIDS FOR FINE PARTICLES

(76) Inventor: Roe-Hoan Yoon, 2909 Wakefield Dr., Blacksburg, VA (US) 20169

( * ) Notice: Subject to any disclaimer, the term of this patent is extended or adjusted under 35 U.S.C. 154(b) by 0 days.

(21) Appl. No.: 09/527,186

(22) Filed: Mar. 17, 2000

(51) Int. Cl.$^7$ ................................................ B01D 37/02
(52) U.S. Cl. ........................ 210/727; 210/730; 210/777; 210/728; 44/626; 209/5
(58) Field of Search ................................. 210/705, 727, 210/728, 729, 730, 748, 770, 772, 777, 778; 44/626; 209/5

(56) References Cited

U.S. PATENT DOCUMENTS

| | | | | |
|---|---|---|---|---|
| 4,207,186 A | * | 6/1980 | Wang et al. | 252/60 |
| 4,210,531 A | * | 7/1980 | Wang et al. | 209/5 |
| 4,385,903 A | * | 5/1983 | Moriyama et al. | 210/716 |
| 5,011,612 A | * | 4/1991 | Keeney | 210/712 |
| 5,215,669 A | * | 6/1993 | Koester et al. | 210/729 |
| 5,346,630 A | * | 9/1994 | Kenney | 210/770 |
| 5,372,727 A | * | 12/1994 | Koester et al. | 210/729 |
| 5,451,329 A | * | 9/1995 | Bode et al. | 210/728 |
| 5,492,631 A | * | 2/1996 | Koester et al. | 210/729 |
| 5,670,056 A | | 9/1997 | Yoon et al. | 210/728 |

OTHER PUBLICATIONS

Flinn, D.H., Guzonas, D.A. and Yoon, R.-H., "Characterization of Silica Surfaces Hydrophobized by Octadecyltrichlorosilane," Colloids and Surfaces A, vol. 87, pp. 163–176, 1994.

Yoon, R.-H. and Ravishankar, S.A., "Long–Range Hydrophobic Forces between Mica Surfaces in Dodecylammonium Chloride Solutions in the Presence of Dodecanol," J. Colloid and Interface Science, vol. 179, pp. 391–402, 1996.

* cited by examiner

*Primary Examiner*—Peter A. Hruskoci
(74) *Attorney, Agent, or Firm*—Grossman, Tucker, Perreault & Pfleger, PLLC

(57) ABSTRACT

Naturally occurring lipids of vegetable and animal origin are broken into smaller molecules, and used as dewatering aids. The process of breaking the molecules include transesterification, interesterification, and saponification followed by acidulation. The modified lipid molecules can adsorb on the surface of the particles to be dewatered and greatly enhance their hydrophobicity, which will help increase the rate of dewatering and hence reduce cake moisture. The modified lipids are more effective dewatering aids than the naturally occurring unmodified lipids, possibly because they can more readily form close-packed monolayers of hydrophobes on the surface of the particles.

15 Claims, No Drawings

METHODS OF USING MODIFIED NATURAL PRODUCTS AS DEWATERING AIDS FOR FINE PARTICLES

BACKGROUND

Solid-liquid separation is an important process in various industries. Water is often the liquid, as it is often the cheapest medium in which various industrial processes are carried out. The process of dewatering can be achieved by either mechanical methods (e.g., filtration and centrifugation) or thermal drying. In general, the former is cheaper than the latter. However, mechanical dewatering becomes increasingly difficult with decreasing particle size.

In a mechanical dewatering process, the particulate materials present in a feed slurry quickly form a bed (or cake) of particles on a medium before the water flows through the cake. The water flow rate, Q, through the cake is determined by the Darcy's law:

$$Q = \frac{K\Delta PA}{\mu L} \qquad [1]$$

where K is the permeability of the cake, $\Delta P$ the pressure drop across the cake, A the filter area, $\mu$ the dynamic viscosity of water, and L is the cake thickness. The driving force for the flow of water is the pressure drop. In vacuum filtration, the pressure drop is less than 1 atm, while in pressure filtration pressures as high as 8–10 atm are applied. In centrifugal filtration, the pressure drop is created by centrifugal force.

A filter cake is considered to consist of capillaries of various radii, which are determined by the size distribution of the particles constituting the filter cake. In a given capillary of radius, r, the water will flow through the capillary if the pressure drop, $\Delta P$, exceeds the pressure of the water inside the capillary. The capillary pressure, p, is given by the Laplace equation:

$$p = \frac{2\gamma\cos\theta}{r}, \qquad [2]$$

where $\gamma$ is the surface tension of water and $\theta$ is the contact angle of the particles in a filter cake. The contact angle is a measure of the hydrophobicity (water-hating property) of the particles.

Eq. [2] suggests three ways of achieving low cake moistures after filtration. These include i) surface tension lowering, ii) capillary radius enlargement, and iii) contact angle increase. Various chemicals (dewatering aids) are used to control these parameters. One group of reagents is the surfactants that can lower the surface tension. Most of the surface tension lowering agents used in industry are ionic surfactants with high hydrophile-lipophile balance (HLB) numbers, which tend to reduce contact angles and, hence, are detrimental to dewatering. Another group of reagents used as dewatering aids are inorganic electrolytes and organic polymers that are used as coagulants and flocculants, respectively. Both of these reagents are designed to increase the particles size and hence increase the capillary radius. However, they too tend to increase the contact angle of the particles, as they are hydrophilic in nature.

The U.S. Pat. No. 5,670,056 teaches a method of using non-ionic (or neutral) low HLB surfactants and water-soluble polymers as hydrophobizing agents that can increase the contact angle. Mono-unsaturated fatty esters, fatty esters and water-soluble polymethylhydrosiloxanes were used as hydrophobizing agents. The fatty esters were used with or without using butanol as a carrier solvent. In a U.S. patent disclosure (Ser. No. 09/327,266), methods of using various other low HLB surfactants as dewatering aids are taught. In another U.S. patent application (Ser. No. 09/326,330), methods of using lipids are disclosed. The primary role of these reagents is to increase the contact angle of the particles to be dewatered. However, they also enlarge particles via hydrophobic coagulation and reduce surface tension. Thus, the dewatering aids disclosed in the pending applications addresses all of the three parameters, i.e., surface tension, contact angle, and capillary radius, toward the right direction. The net result of using such reagents as dewatering aids is that the rate of dewatering (given by Eq. [1]) is vastly higher than other dewatering aids, which gives rise to lower cake moistures.

An advantage of using the lipids as dewatering aids, as disclosed in U.S. patent application with a Ser. No. 09/326,330, is that they are of low cost and environmentally safe to use. Lipids are naturally occurring hydrophobic organic molecules isolated from biological cells and tissues. Animal fats and vegetable oils are the most widely occurring lipids, which are triesters of glycerol with three long-chain carboxylic acids. The performance of these reagents is slightly inferior to those of the low HLB: surfactants disclosed in the U.S. patent application with a Ser. No. 09/327,266, which may be attributed to the likelihood that the lipid molecules are too large to form close-packed monolayers of hydrophobes on the surface of the particles to be dewatered.

OBJECTS OF THE INVENTION

It is an object of the present invention to provide a novel method of decreasing the moisture of fine particulate materials during mechanical dewatering processes such as vacuum filtration, pressure filtration, and centrifugal filtration.

Another important object of the invention is to increase the rate at which water is removed so that given dewatering equipment can process higher tonnages of particulate materials.

Still another object of the instant invention is the provision of a novel dewatering method that creates no adverse effects on up- and downstream processes when the water removed from the dewatering processes disclosed in the present invention is recycled.

Yet another object of the invention is the provision of methods of controlling the frothing properties of the flotation product.

Perhaps the most important object of the instant invention is to achieve all of the above objects using low-cost affordable dewatering aids that have no harmful effects on the environment and the human health.

SUMMARY OF THE INVENTION

It is the most important object of this invention to provide an efficient method of dewatering fine particulate materials. This is achieved by destabilizing the water on the surface of the particles to be dewatered by rendering the surface substantially hydrophobic. The particles are hydrophobized normally in two steps. Initially, surfactants of high hydrophile-liphophile balance (HLB) numbers are used to render a particulate material moderately hydrophobic. The material is subsequently treated with a modified lipid to further enhance its hydrophobicity close to or above the water contact angle of 90°. This will greatly decrease the pressure of the water in the capillaries formed between the particles in a filter cake, and thereby allow the water to be removed more readily during mechanical dewatering processes.

A key to the methods of dewatering described in the present invention disclosure is the hydrophobicity enhancement step. According to the Laplace equation, a relatively small increment in hydrophobicity (above the level that can normally be achieved using a high HLB surfactant in the first hydrophobization step) can bring about a large decrease in the capillary pressure. The initial hydrophobization step may be omitted, if the particulate material is naturally hydrophobic or has been hydrophobized in an upstream process (e.g., flotation) preceding dewatering. However, the particles must remain reasonably hydrophobic at the time of the hydrophobicity enhancement step. Otherwise, the dewatering aids added in this step do not adsorb on the surface of the particulate material and fail to enhance its hydrophobicity.

In the present invention, naturally occurring lipids of vegetable and animal origin are broken into smaller molecules, so that they can more readily form close-packed layers of hydrophobes and, hence, greatly enhance the hydrophobicity of the particles. The lipid molecules are transesterified by reacting with alcohols in an appropriate catalyst to form monoesters, interesterified with glycerol to form mono- and diacylglycerols, and saponified and then acidulated to form fatty acids. The reaction products are used directly as dewatering aids without purification, which will keep the costs of the reagents acceptable for dewatering materials of relatively low value such as coal and mineral fines.

The modified lipids used in the second hydrophobization step of the present invention are insoluble in water; therefore, they are used as solutions in appropriate solvents, which include but not limited to light hydrocarbon oils and short-chain alcohols. The modified lipid molecules may act as low HLB surfactants that can greatly enhance the hydrophobicity of the particulate material to be dewatered.

The dewatering methods disclosed in the instant invention are capable of greatly increasing the dewatering rate and, hence, reduce the final cake moisture. Furthermore, the dewatering aids of the present invention have the characteristics of anti-forming agents, which is important for processing the particulate materials produced from flotation processes. Also, most of the reagents added as dewatering aids and blends thereof adsorb on the surfaces of minerals and coal fines so that the plant water does not contain significant amounts of residual reagents.

DETAILED DESCRIPTION OF THE INVENTION

The difficulty in removing water from the surface of fine particles may be attributed to the fact that water molecules are held strongly to the surface via hydrogen bonding. One can break the bonds and remove the water by subjecting the wet particles to intense heat, high-pressure filters and high-G centrifuges. However, the use of such brute forces entails high energy costs and maintenance problems. A better solution would be to destabilize the surface water by appropriate chemical means, so that it can be more readily removed by the weaker forces imparted by vacuum or low-pressure filters.

The affinity of water adhering to the surface of a solid may be best represented by the hydrophobicity of the surface. The stronger the hydrophobicity, the lower the affinity. One may use appropriate reagents to increase the hydrophobicity and destabilize surface water. A traditional measure of surface hydrophobicity is water contact angle. In the cessile drop technique, contact angle is measured by placing a droplet of water on the surface of a solid of interest. The contact angle, measured through the aqueous phase, increases with increasing hydrophobicity.

In the present invention, particles in aqueous slurry are hydrophobized in two steps. In the first step, an appropriate surfactant is added to the slurry, so that it can adsorb on the surface of the particles to be dewatered and render them moderately hydrophobic. The contact angle of the particulate material may be increased to the range of 25 to 60°. For hydrophilic particles, high HLB surfactants are used to bring the contact angle to this range. In the second step, a modified lipid is added to the slurry to further increase the contact angle over 60°, preferably close to or over 90°. The hydrophobicity-enhancing step is essential for destabilizing the surface water and, thereby, expedites the process of mechanical dewatering. The first hydrophobization step may be omitted if the particles are moderately hydrophobic by nature or by virtue of an upstream process.

A pending U.S. patent application (Ser. No. 09/327,266) also discloses the advantages of incorporating a second hydrophobization step. In this application, well-defined low HLB surfactants are used as the hydrophobicity-enhancin reagent. However, many of the low HLB surfactants are considerably more expensive than the lipids disclosed in the present invention.

Another pending U.S. patent application (Ser. No. 09/326,330) discloses a method of incorporating a second hydrophobization step, in which the hydrophobicity-enhancing reagents are lipids. These are naturally occurring organic molecules that can be isolated from plant and animal cells (and tissues) by extraction with nonpolar organic solvents. Large parts of the molecules are hydrocarbons (or hydrophobes); therefore, they are insoluble in water but soluble in organic solvents such as ether, chloroform, benzene, or an alkane. Thus, the definition of lipids is based on the physical property (i.e., hydrophobicity and solubility) rather than by structure or chemical composition. Lipids include a wide variety of molecules of different structures, i.e., triacylglycerols, steroids, waxes, phospholipids, sphingolipids, terpenes, and carboxylic acids. They can be found in various vegetable oils (e.g., soybean oil, peanut oil, olive oil, linseed oil, sesame oil), fish oils, butter, and animal oils (e.g., lard and tallow). Although fats and oils appear different, that is, the former are solids and the latter are liquids at room temperature, their structures are closely related. Chemically, both are triacylglycerols; that is, triesters of glycerol with three long-chain carboxylic acids. They can be readily hydrolyzed to fatty acids. Corn oil, for example, can be hydrolyzed to obtain mixtures of fatty acids, which consists of 35% oleic acid, 45% linoleic acid and 10% palmitic acid. The hydrolysis products of olive oil, on the other hand, consist of 80% oleic acid. Waxes can also be hydrolyzed, while steroids cannot. Vegetable fats and oils are usually produced by expression and solvent extraction or a combination of the two. Pentane is widely used as a solvent, and is capable of extracting 98% of soybean oil. Some of the impurities present in crude oil, such as free fatty acids and phospholipids, are removed from crude vegetable oils by alkali refining and precipitation. Animal oils are produced usually by rendering fats.

In the present invention, hydrophobic lipids are modified so that they can more readily form closed-packed hydrophobes on the surface of the particles to be dewatered. The triacylglycerols present in the naturally occurring lipids may be considered to be large surfactant molecules with three hydrocarbon tails, which may be too large to form close-packed monolayers of hydrophobes. A solution to this problem is to break the molecules into smaller ones before using them as dewatering aids. In one method, triacylglycerols are subjected to transesterification reactions to produce monoesters. Typically, an animal fat or oil is mixed with an alcohol and agitated in the presence of a catalyst usually $H^+$ or $OH^-$ ions. If methanol is used, for example, methyl fatty esters of different chain lengths and structures are formed along with glycerol. The reactions can be carried out at room temperature; however, the reactions may be carried out at elevated temperature in the range of 40 to 80° C. to expedite the reaction rate.

In another method, triacylglycerols are hydrolyzed to form fatty acids. They can be hydrolyzed in the presence of $H^+$ or $OH^-$ ions. In the case of using the $OH^-$ ions as catalyst, the fatty acid soaps formed by the saponification reactions are converted to fatty acids by adding an appropriate acid.

In still another method, triacylglycerols are reacted with glycerol to produce a mixture of esters containing one or two acyl groups. This reaction is referred to as interesterification.

The process of breaking the lipid molecules are simple and, hence, do not incur high costs. Furthermore, the reaction products may be used without further purification, which contributes further to reducing the reagent costs.

The acyl groups of the naturally occurring lipids contain even number of hydrocarbons between 12 and 20, and may be either saturated or unsaturated. The unsaturated acyl groups usually have cis geometry, which is not conducive to forming close packed monolayers of hydrocarbons. Some of the lipids have higher degrees of unsaturation than others. Therefore, it is desirable to either use the lipids of lower degree of unsaturation, or use the lipids of high degree of unsaturation after hydrogenation. The hydrogenation can decrease the degree of unsaturation of the acyl groups. This technique can be applied before or after breaking the triacylglycerols to smaller molecules using the methods described above.

Since the modified lipids have: low HLB numbers, they may be used as solutions of appropriate solvents including but not limited to short-chain alcohols and light hydrocarbon oils. Typically, one part by volume of a lipid, which may be termed as active ingredient(s), is dissolved in two parts of a solvent before use.

The high HLB surfactants used in the first hydrophobization step adsorb only on specific surface sites. The population of the surface sites, at which the adsorption can occur, is usually well below what is needed to form a close-packed monolayer of the adsorbed surfactant molecules. The modified hydrophobic lipids that are used in the second hydrophobization step may adsorb in between the sparsely populated hydrocarbon tails of the high HLB surfactants, so that the surface is more fully covered by a close-packed monolayer of hydrophobes. It has been shown that the hydrocarbon tails of the surfactant molecules adsorbing on the surface of a solid begin to stand up vertically and form a close-packed monolayer at a contact angle close to or above 90° (Flinn, et al. Colloids and Surfaces A, vol. 87, p. 163, 1994). It has also been shown that the force of attraction between two hydrophobic surfaces increases sharply at contact angle 90° (Yoon and Ravishankar, J. Colloid and Interface Science, vol. 179, p. 391, 1996). That the modified lipids used in the present invention are smaller in molecular size than the naturally occurring-lipids should be conducive to forming close-packed monolayers of hydrophobes and, hence, increasing contact angles. Also, the use of lipids whose acyl groups have a higher degree of saturation should be more conducive to forming closed-packed monolayers of hydrophobes.

Test Procedure

Several different coal samples were used for a series of laboratory-scale dewatering tests. In a given test, a volume of coal slurry was placed in an Erlenmeyer flask, into which a known amount of reagent(s) was added and agitated for 2 minutes. The conditioned slurry was poured into a 2.5-inch Buchner funnel with glass frit of medium porosity, which in turn was mounted on a vacuum chamber. After a preset drying cycle time (usually 2 minutes), the product was removed from the Buchner funnel and analyzed for moisture.

EXAMPLES

Example 1

A coconut oil was mixed with butanol at a molar ratio of approximately 1:3. The mixture was agitated at approximately 50° C. for about 1 hour after adding 2.5% by volume of acetic acid. The reaction product was cooled down to the ambient temperature before using it as a dewatering aid without purification. The acyl groups of the triacylglycerols present in the coconut oil consist of approximately 50% lauric acid, 18% myristic acid, 8% palmitic acid, and 6% oleic acid. Therefore, the transesterification product should include monoesters of butyllaurate, butylmyristate, butylpalmitate, and butyloleate in similar proportions and glycerol. The smaller size of these molecules can more readily form close-packed monolayers of hydrophobes on the surface of the particles to be dewatered. The coconut oil has a relatively small amount of unsaturated hydrocarbons as compared to other naturally occurring lipids, which should serve as an additional factor in forming the close-packed monolayers of hydrophobes.

Table 1 shows the results of the vacuum filtration tests conducted using the modified coconut oil as a dewatering aid. The tests were conducted with and without using diesel oil as a solvent. When using the solvent, one part of the modified lipid was dissolved in two parts of diesel oil before use. Also shown in the table are the results obtained using the individual components of the dewatering aid. The coal sample that was for the dewatering tests was prepared by pulverizing a clean coal from a dense-medium separator to finer than 0.6 mm. The pulverized coal sample was floated using 1 lb/ton kerosene and 0.2 lb/ton methylsiobutylcarninol (MIBC). The flotation product, whose pulp density was 16.3% solids, was subjected to filtration experiment using a 2.5-inch Buchner funnel at 25 inches Hg vacuum pressure, 0.41 inches cake thickness, and 2 minutes of drying cycle time.

As shown, the results obtained using the modified coconut oil were more effective than the case of using coconut oil directly. The improvement may be attributed to the fact that triacylglycerols have been broken into smaller molecules, which can more readily form close-packed layers of hydrophobes. The modified coconut oil was more effective when it was used as a solution in diesel oil. The results obtained using the modified coconut oil were superior to those obtained using butanol and diesel oil as dewatering aids, which demonstrates that the improved dewatering was brought about by the modification of the lipid rather than the solvent or the alcohol that was used as a feedstock for the transesterification reaction.

TABLE 1

Results of the Filtration Tests Conducted Using a Modified Coconut Oil with a 0.6 mm × 0 Middle Fork Coal Sample

| | Cake Moisture (% wt) | | | | | |
| --- | --- | --- | --- | --- | --- | --- |
| | Coconut Oil | | | | | |
| Reagent | w/o Diesel | | w/ Diesel | | | |
| Dosage (lbs/ton)[1] | Unmod-ified | Modified | Unmod-ified | Modified | Butanol | Diesel |
| 0 | 21.5 | 21.5 | 21.5 | 21.5 | 21.5 | 21.5 |
| 1 | 17.1 | 17.4 | 16.6 | 15.8 | 19.3 | 17.6 |
| 3 | 16.0 | 15.9 | 15.4 | 13.3 | 18.9 | 18.5 |
| 6 | 15.4 | 14.5 | 13.6 | 12.2 | 18.9 | 18.4 |
| 9 | 15.0 | 15.0 | 13.5 | 11.3 | 19.0 | 18.7 |
| 15 | 14.9 | 14.9 | 12.6 | 10.2 | 19.9 | 17.5 |

[1]includes active ingredient and solvent (diesel).

Example 2

In this example, a lipid of animal origin (lard oil) was modified and used as a dewatering aid. A volume of the lard oil was mixed with ethanol at an approximate molar ratio of 1:3, and agitated on a hot plate for one hour after adding acetic acid (2.5% by volume) to the mixture. The reaction product was used as a dewatering aid without purification. The acyl groups of the triacylglycerols consist of 50% oleic acid, 25% palmitic acid, and 15% stearic acid. Therefore, the transesterification products may include ethyloleate, ethylpalmitate, and ethylstearate in a similar proportion.

A series of vacuum filtration tests were conducted on a coal sample (0.5 mm×0) from Australia using a 2.5-inch diameter Buchner funnel using the modified lard oil as a dewatering aid. It was found that the coal sample was slightly oxidized during shipment. Therefore, it was wet-ground in a ball mill for a short period of time as a means of regenerating fresh unoxidized surface. The mill product was floated using 1 lb/ton kerosene and 0.2 lb/ton MIBC. The flotation product (16.2% solids) was used as the feed to a series of filtration tests at 25 inches Hg of vacuum pressure, 0.42 inches of cake thickness, and 2 minutes of drying cycle time.

The results given in Table 2 show that the modified lard oil gave substantially lower cake unmodified lard oil. The best results were obtained when the modified lard oil was used after dissolving 1 part of the modified lard oil with 2 parts of diesel oil. The results obtained using ethanol and diesel oil as dewatering aids were not as good as those obtained using the modified lard oil.

TABLE 2

Results of the Filtration Tests Conducted on a 0.5 mm × 0 Australian Coal Sample Using a Modified Lard Oil

| | Cake Moisture (% wt) | | | | | |
| --- | --- | --- | --- | --- | --- | --- |
| | Lard Oil | | | | | |
| Reagent | w/o Diesel | | w/ Diesel | | | |
| Dosage (lbs/ton)[1] | Unmod-ified | Modified | Unmod-ified | Modified | Ethanol | Diesel |
| 0 | 22.4 | 22.4 | 22.4 | 22.4 | 22.4 | 22.4 |
| 1 | 19.0 | 17.7 | 17.1 | 16.4 | 20.5 | 19.9 |
| 3 | 16.0 | 15.8 | 15.2 | 13.44 | 19.1 | 18.1 |
| 6 | 15.4 | 15.6 | 13.8 | 11.5 | 18.6 | 17.9 |
| 9 | 15.3 | 15.0 | 12.8 | 10.4 | 18.7 | 18.7 |
| 15 | 14.9 | 15.3 | 12.2 | 9.9 | 18.4 | 19.0 |

Example 3

Sunflower oil was transesterified with methanol in a similar manner as described in Examples 1 and 2. The acyl groups of the lipids in sunflower oils consist of 62–70% linoleic acid, 15–25% licinoleic acid, and 5–7% palmitic acid. Thus, the transesterification product should consist of methyllinolate, methyllicinolate, and methylpalmitate in a similar proportion. The modified sunflower oil was used as a dewatering aid without purification in a series of vacuum filtration tests. In each experiment, one part of the modified sunflower oil was dissolved in two parts of diesel oil before use. All test were conducted using a 2.5-inch diameter Buchner funnel at parts of drying cycle time and 0.4 inch cake of thickness. The filtration tests were conducted on a Meadow River coal sample from Virginia. It was freshly pulverized and floated using 1 lb/ton Kerosene and 0.2 lb/ton MIBC prior to the filtration tests. The pulp density of the flotation product was 16.9%. The results given in Table 3 show that the modified sunflower oil gave considerable better results than the case of using the naturally occurring lipid without modification. The reagent dosages given in the table represent only the amount of the active ingredient (i.e., the modified sunflower oil) used in each experiment and do not include the amount of the solvent (diesel oil) used.

TABLE 3

Results of the Filtration Tests Conducted on a 0.5 mm × 0 Meadow River Coal Sample Using Sunflower Oil with and without Modification

| Reagent | Moisture Content (% wt) | |
| --- | --- | --- |
| Dosage (lbs/ton)[1] | Un-modified | Modified |
| 0 | 22.6 | 22.6 |
| 1 | 16.3 | 13.5 |
| 2 | 14.4 | 11.0 |
| 3 | 13.8 | 10.6 |
| 5 | 13.3 | 9.9 |

[1]not including diesel oil dosage

Example 4

A series of vacuum filtration tests were conducted using a safflower oil with and without transesterification. A volume of safflower oil was mixed with a volume of ethanol at a molar ratio of approximately 1:3 and, then, agitated on a hot plate in the presence of 5% by volume of acetic acid. The acyl groups of the triacylglycerols present in safflower oils contain 70–80% oletic and linoleic acid and 6–7% palinitic acid. The modified safflower oil was used as a dewatering aid without purification. The filtration tests were conducted using a 2.5-inch diameter Buchner funnel at 2 minutes of drying cycle time and 0.4–0.5 inches of cake thickness. The tests were conducted on a coal sample from the Middle Fork coal preparation plant, Virginia. The coal sample was pulvereized, wet-ground in a ball mill, and floated in the same manner as described in the preceding examples. The %solids of the flotation product was 16.1%. In each experiment, one part of the modified safflower oil was dissolved in two parts of diesel oil. The results given in Table 4 show that lower moisture filter cakes can be obtained when the safflower oil was broken into smaller molecules before using it as a dewatering aid.

TABLE 4

Results of the Vacuum Filtration Tests Conducted on a 0.5 mm × 0 Middle Fork Coal Sample Using a Modified Safflower Oil

| Reagent Dosage (lbs/ton) | Moisture Content (% wt) | |
|---|---|---|
| | Un-modified | Modified |
| 0 | 19.3 | 19.3 |
| 1 | 13.3 | 10.7 |
| 2 | 12.2 | 11.3 |
| 3 | 12.7 | 10.6 |
| 5 | 11.3 | 10.3 |

Example 5

A lard oil was transesterified with methanol in the presence of 5% by volume of acetic acid as described in Example 2. The product, containing methyloleate, methylpalmitate, methylstearate, and glycerol, was used as a dewatering aid without purification in a series of vacuum filtration tests. The tests were conducted on the Meadow River coal sample, which had been pulverized and ground in the same manner as described in Example 3. The filtration tests were conducted using a 2.5-inch diameter Buchner funnel at 2 minutes of drying cycle time and 0.4 inches of cake thickness. The results show that the use of the modified lard oil reduced the cake moistures substantially below the values obtained using the lard oil without modification.

TABLE 5

Results of the Filtration Tests Conducted on a 0.5 mm × 0 Meadow River Coal Sample Using a Modified Lard Oil

| Reagent Dosage (lbs/ton) | Moisture Content (% wt) | |
|---|---|---|
| | Un-modified | Modified |
| 0 | 21.5 | 21.7 |
| 1 | 16.9 | 14.4 |
| 2 | 16.6 | 12.4 |
| 3 | 16.2 | 10.7 |
| 5 | 15.7 | 9.9 |

Example 6

In this example, a fish oil was mixed with ethanol at a molar ratio of approximately 1:3 and subjected to transesterification reaction at 5% by volume of acetic acid. Fish oils contain a large amount of polyunsaturated hydrocarbons, and contain longer hydrocarbon chains than vegetable oils and lard oils. The reaction product was used without purification as a dewatering aid. A series of vacuum filtration tests were conducted on the Middle Fork coal sample using a 2.5-inch diameter Buchner funnel. In each experiment, 2 minutes of drying cycle time was employed, and the cake thicknesses were in the range of 0.4–0.5 in. The coal samples used for the filtration experiments were prepared in the same manner as described in Example 4. The results given in Table 6 show that the use of the modified fish oil reduced the cake moistures below those obtaining using unmodified fish oil. However, the difference was smaller than the case of using lard oil (see example 5). This may be attributed to the fact that fish oils contain a large amount of polyunsaturated hydrocarbons, which are not conducive to forming a close-packed layer of hydrocarbons on the surface of the particles to be filtered.

TABLE 6

Results of the Filtration Tests Conducted on a 0.5 mm × 0 Middle Fork Coal Sample Using a Modified Fish Oil

| Reagent Dosage (lbs/ton) | Moisture Content (% wt) | |
|---|---|---|
| | Unmodified | Modified |
| 0 | 20.0 | 20.0 |
| 1 | 14.5 | 11.2 |
| 2 | 12.8 | 10.5 |
| 3 | 12.1 | 10.1 |
| 5 | 13.1 | 10.0 |

Example 7

In the example, a mixture of partially hydrogenated vegetable oils (soybean and cotton seed) was transesterified using methanol and ethanol and ethanol in the presence of acetic acid. The reaction product was used as dewatering aids for the filtration of the Middle Fork coal sample. The tests were conducted on 1 mm×0 and 0.6 mm×0 samples, both of which were flotation products. The filtration tests were conducted using a 2.5-inch diameter Buchner funnel at a vacuum pressure of 25 inches Hg, 0.4–0.42 inches of cake thickness, and 2 minutes of drying time. Low levels of cake moistures were obtained as shown in Table 7, which may be attributed to the fact that saturated hydrocarbons can more readily form close-packed monolayers.

TABLE 7

Use of Hydrogenated Vegetable Oils for the Filtration of a Middle Fork Coal Sample

| Reagent Dosage (lbs/ton) | Moisture Content (% wt) | |
|---|---|---|
| | Methanol 1 mm × 0 | Ethanol 0.6 mm × 0 |
| 0 | 17.2 | 20.1 |
| 1 | 13.2 | 14.2 |
| 2 | 11.1 | 12.1 |
| 3 | 8.5 | 11.6 |
| 5 | 8.2 | 10.9 |

I claim:
1. A process for dewatering a slurry of fine particulate material, comprising:
   i) increasing the hydrophobicity of said material to exhibit a water contact angle less than 90°,
   ii) adding a water insoluble modified lipid dissolved in an organic solvent or mixtures of organic solvents to said slurry, wherein said modified lipid is a reaction product of a lipid or mixture of lipids broken into smaller molecules by either transesterification, saponification followed by acidulation, or by interesterification, iii) agitating the slurry to allow for the modified lipid molecules to adsorb on the surface of said material so that its hydrophobicity is enhanced and said material exhibits a water contact angle over 60°, and iv) subjecting the agitated slurry containing the material, to a mechanical method of dewatering for removing moisture from said material.

2. The process of claim 1 wherein the fine particulate material is smaller than 2 mm in diameter.

3. The process of claim 1 wherein the initial hydrophobization step is achieved using surfactants and collectors, including those that are used for flotation.

4. The process of claim 1 wherein the particulate material includes material selected from the group consisting of: mineral, coal, inorganic pigments, plastics, metals, metal powders, fly ash, and biological materials.

5. The process of claim 1 wherein the said mechanical method of dewatering includes a method selected from the group consisting of: vacuum filtration, pressure filtration, and centrifugal filtration.

6. The process of claim 1 wherein the said modified lipid is prepared from a lipid or mixtures of lipids selected from the group consisting of: vegetable oils, plant oils, fish and animal oils, fats, steroids and waxes.

7. The process of claim 1 wherein the said transesterification involves steps of reacting lipids with alcohols in the presence of catalyst at a temperature of less than 80° C.

8. The process of claim 1 wherein the said saponification involves steps of reacting lipids with an alkali in water and subsequently lowering the pH to form fatty acids.

9. The process of claim 1 wherein the said interesterification involves the steps of reacting lipids with glycerol, monoacylglycerols, and/or diacylglycerols.

10. The process of claim 1 wherein the said organic solvents are selected from the group consisting of: light hydrocarbon oils, short-chain alcohols, and ethers.

11. A process for dewatering a slurry of naturally hydrophobic particulate material, comprising:

i) adding a water insoluble modified lipid dissolved in an organic solvent or mixtures of organic solvents to said slurry, wherein said modified lipid is a reaction product of a lipid or mixture of lipids broken into smaller molecules by either transesterification, saponification followed by acidulation, or by interesterification, ii) agitating the slurry to allow for said modified lipid molecules to adsorb on the surface of said naturally hydrophobic particulate material so that its hydrophobicity is enhanced and said material exhibits a water contact angle over 60°, and iii) subjecting the agitated slurry containing the particulate material, to a mechanical method of dewatering for removing moisture from said material.

12. The process of claim 11 wherein the said naturally hydrophobic particulate material is smaller than 2 mm in diameter.

13. The process of claim 11 wherein the said naturally hydrophobic particulate material includes material selected from the group consisting of: graphite, sulfur, molybdenite, diamond, coal and talc.

14. The process of claim 11 wherein the said mechanical method of dewatering includes a method selected from the group consisting of: vacuum filtration, pressure filtration, and centrifugal filtration.

15. The process of claim 11 wherein the said organic solvent is selected from the group consisting of: light hydrocarbon oils, short-chain alcohols, and ethers.

* * * * *